United States Patent [19]

Ito et al.

[11] Patent Number: 4,852,798

[45] Date of Patent: Aug. 1, 1989

[54] AIR CONDITIONING APPARATUS FOR A MOTOR VEHICLE

[75] Inventors: Toshikazu Ito, Toukai; Takashi Degawa, Mito, both of Japan

[73] Assignee: Hitachi, Ltd., Tokyo, Japan

[21] Appl. No.: 122,751

[22] Filed: Nov. 19, 1987

[30] Foreign Application Priority Data

Dec. 15, 1986 [JP] Japan ................................ 61-296542

[51] Int. Cl.$^4$ ............................................ G05D 23/00
[52] U.S. Cl. ................................... 237/2 A; 236/91 F
[58] Field of Search ............. 237/2 A, 12.3 A, 12.3 B, 237/12.3 R; 236/91 D, 13, 91 F; 165/42, 31

[56] References Cited

U.S. PATENT DOCUMENTS 4,562,954  1/1986  Kajita .................................. 237/2 A Primary Examiner—Henry A. Bennet
Attorney, Agent, or Firm—Antonelli, Terry & Wands

[57] ABSTRACT

The present invention relates to an air conditioning apparatus equipped with upper and lower air mix doors and mode doors. In the present invention, the air flow volume distribution of the upper and lower blow ports is controlled continuously by regulating the opening degrees of the mode doors by one actuator controlled by instruction signal of a control device through a side link having cams corresponding to the number of the mode doors with respect to the outdoor temperature and quantity of solar radiation. The desired air discharge temperature is controlled by regulating the opening degrees of the upper and lower air mix doors by the instruction of the control device corresponding to the outdoor temperature and quantity of solar radiation.

8 Claims, 3 Drawing Sheets ic diagram of FIG. 2 shows an example when the set-

AIR CONDITIONING APPARATUS FOR A MOTOR VEHICLE

FIELD OF THE INVENTION

This invention relates to an air conditioning apparatus for a motor vehicle, more particularly, the present invention relates to an air conditioning apparatus which is suitable for upper and lower independent air discharge temperature controlling and upper and lower discharge wind volume distribution.

BACKGROUND OF THE INVENTION

In a prior air conditioning apparatus, for example as shown in FIG. 2 of Japanese Patent Laid-Open Application No. 55-68416 published on May 23, 1980 in the title of "Air conditioning apparatus for a vehicle", air flow dampers are arranged for controlling wind volume blown out of each blow port, and each flow damper is operated by an actuator for exclusive use thereof.

Since the prior art air conditioning apparatus is equipped with an air flow damper for each blow port, there are problems in reliability and price. And further, the prior art does not explain how to distribute air wind comfortably.

SUMMARY OF THE INVENTION

An object of the present invention is to provide an air conditioning apparatus for a motor vehicle in which the upper and lower wind volume distribution apparatus is simplified, has high reliability, and is able to distribute air wind comfortably.

The object of the present invention is accomplished by operating a vent door, a floor door, and a defrost door (hereunder, mode doors) in stepless regulation corresponding to thermal load, and controlling each mode door continuously by using a side link comprising link cams for driving each mode door, which is driven by one actuator.

According to the present invention, the distribution of the upper and lower blow winds is determined corresponding to outdoor temperature and quantity of solar radiation which constitute thermal load. The wind volume distribution can be performed comfortably the upper and lower temperature distribution by controlling the mode doors in stepless regulation within a temperature range which is blown out of an upper portion temperature control air mix door, and a lower portion temperature control air mix door explained later. Since the mode doors also serve as air flow dampers and blow portion changeover dampers, and one actuator is able to operate linking to the mode doors, it is possible to provide an air conditioning apparatus for a motor vehicle which has high reliability and the wind volume distribution can be performed comfortably.

DETAILED DESCRIPTION OF THE PREFERRED EMBODIMENTS

Figure 1:
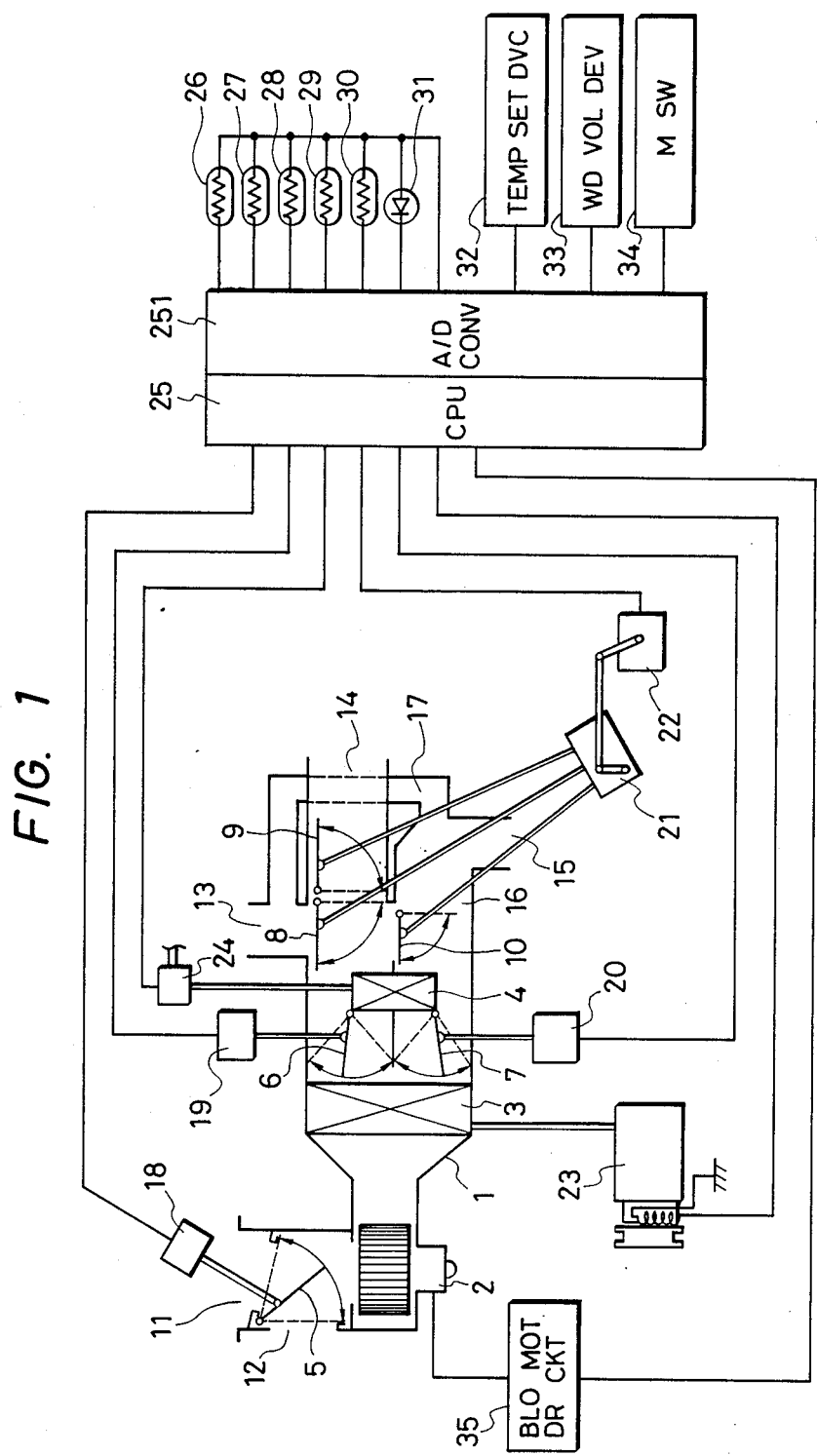
FIG. 1 is a typical diagram of an air conditioning apparatus for a motor vehicle showing one embodiment of the present invention.

Referring to FIG. 1, 1 denotes a duct casing which encloses each constructing apparatus of the air conditioning apparatus of the present invention. The duct casing 1 is furnished a blower motor 2 for causing air flow, an evaporator 3 for cooling the air flow, and a heater core 4 for heating the air flow used for a reheat air mix type air conditioning apparatus. 5 is an external and internal air suction port door which regulates the ratio of room air and outdoor air introduced by the blower motor by the opening degree of the door. 6 is the upper portion temperature control air mix door. 7 is the lower portion temperature control air mix door. 8 is the defroster door. 9 is the vent door. 10 is the floor door. 8, 9 and 10 are blow port changeover doors named generally as the mode doors. 11 is an external air suction port. 12 is an internal air circulating port. 13 is a defroster blow port. 14 is a vent blow port. 15 is a floor blow port. 16 is a floor bypass port. 17 is a floor-defroster bypass duct. 18 is an actuator used for controlling the external and internal air suction port door. 19 is an actuator used for controlling the upper portion air mix door. 20 is an actuator used for controlling the lower portion air mix door. 21 denotes a cam link device (or, the side link) for controlling the mode doors comprising the defroster door 8, the vent door 9, and the floor door 10 corresponding to an air conditioning mode. The side link 21 comprises three cams for controlling the mode doors 8, 9, 10 according to outer peripheral configurations of these cams, and three wires connected between the mode doors and the outer peripheral portions of these cams. 22 is an actuator for controlling the side link 21. 35 is a blower motor driving circuit. 23 is a compressor used for the evaporator 3. 24 is a warm water control valve. 25 is a control device such as a micro computer. 251 is an A/D converter. 26 is an outdoor air temperature sensor. 27 is a passenger room air temperature sensor. 28 is a floor blow air temperature sensor. 29 is a vent blow air temperature sensor. 30 is a defroster blow air temperature sensor. 31 is a solar radiation sensor. 32 is a temperature setting device. 33 is a wind volume setting device. 34 is a mode switch which is able to regulate manually the opening degree of either one of the defrost door, the vent door, or the floor door.

Figure 2:
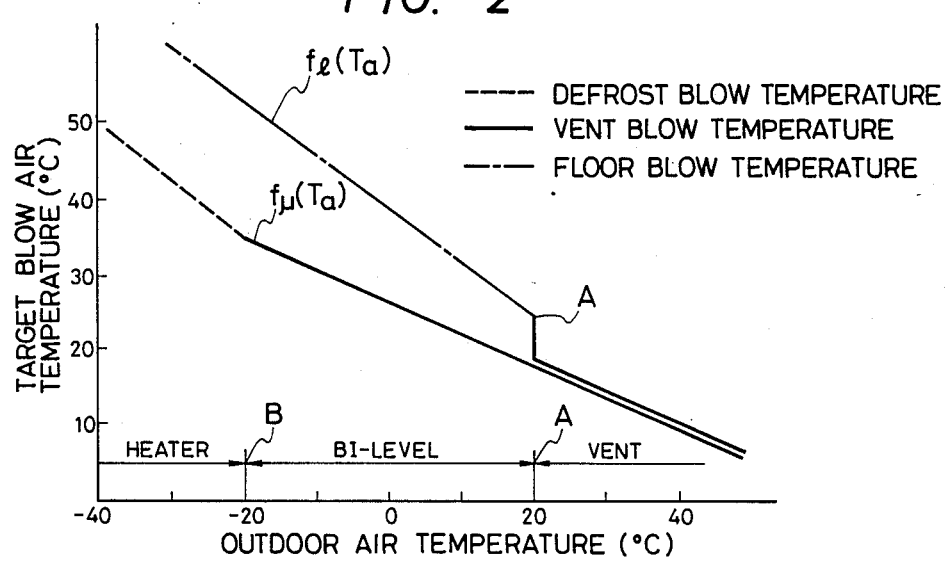
FIG. 2 is a characteristic diagram showing target blow air temperature and changeover of mode doors corresponding to outdoor air temperature in the air conditioning apparatus for a motor vehicle shown in FIG. 1.

FIG. 2 shows a characteristic diagram showing one example of the desired air discharge temperature control and the mode doors control. The axis of abscissa indicates outdoor air temperature, and the axis of ordinate desired air discharge temperature. The characteristic diagram of FIG. 2 shows an example when the setting temperature is selected to 25° C. by the temperature setting device 32. By changing the setting temperature, the characteristic of the desired air discharge temperature moves along the axis of ordinate. In FIG. 2, the solid line shows the upper portion blow air temperature, namely, air temperature of the vent blow port 14. In general, since passengers in the motor vehicle feel displeasure when the temperature of the wind blown out of the vent blow port is higher than a predetermined value, the blow wind is changed from the vent blow port to the defrost blow port at 35° C. (B point in FIG. 2) in the present invention. Since the blow wind controls the temperature of the upper portion of the passenger compartment so as to prevent the blur of the window thereof along the front glass thereof when the blow wind is changed from the vent blow port to the defrost blow port, it is desirable to set the target blow air temperature higher. The dashed line in FIG. 2 shows the lower portion blow air temperature which is the air temperature of the floor blow port 15. In general, since the passengers in the compartment of the motor vehicle feel displeasure when the temperature of the air flow blown out of the floor vent port is lower than a predetermined value, the blow wind is changed from the floor blow port to the vent blow port at 30° C. (A point in FIG. 2) in the present invention. According to the air conditioning apparatus of the present invention, the upper and lower blow air temperatures in wide region can be obtained in a comfortable bi-level mode (keeping the head cool and the feet warm). The upper and lower air mix doors are controlled independently to be target temperatures along two lines shown in FIG. 2. By detecting the blow air temperatures by each temperature sensor, the compartment of the motor vehicle can be maintained in a comfortable blow air temperature. The changeovers of the blow air ports are carried out by memorizing the actuating points of each changeover door of blow port to the control device, and operating the side link 21 by the control actuator 22 when the blow air temperatures reach to the setting temperatures. The control of the desired air discharge temperatures of the present invention is carried out according to two characteristic lines shown in FIG. 2, as explained above.

Figure 3:
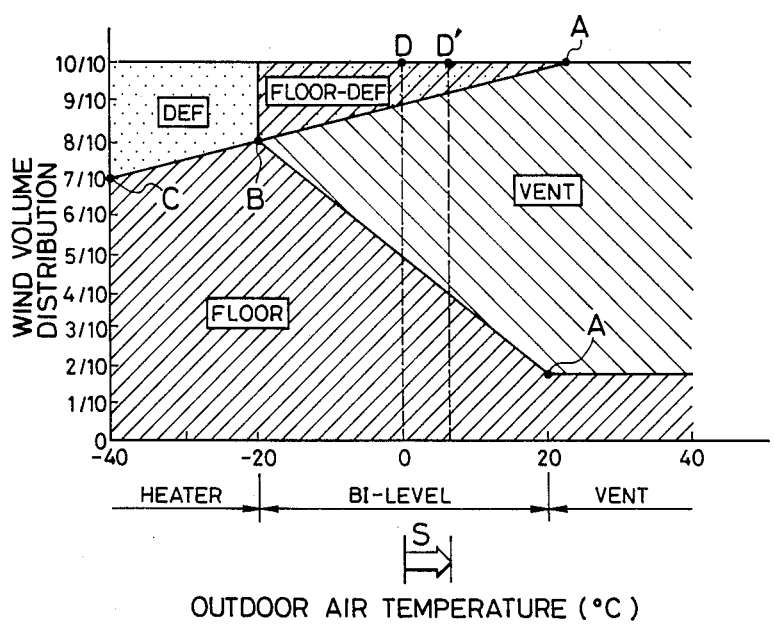
FIG. 3 shows wind volume distribution characteristic diagram in each blow port corresponding to outdoor air temperature in the air conditioning apparatus for a motor vehicle shown in FIG. 1.

Referring to FIG. 3, when the outdoor temperature is higher than A point, the control of air flow volume distribution is in vent mode; when the outdoor temperature is lower than B point, the control thereof is in heater mode; and when the outdoor temperature is between A point and B point, the control thereof is in bi-level mode. In the vent mode, the heater mode, and the bi-level mode, the flow volume distribution of each blow port is controlled in stepless regulation according to FIG. 3. The control of the present invention is carried out in stepless regulation between the A point and the B point by the actuator 22 which controls the side link 21. In the high temperature side of the A point, it is through the floor bypass port 16 shown in FIG. 1 that the cool air flow is bypassed to the floor of the motor vehicle for removing the gloomy feeling of feet of the passengers of the motor vehicle in high temperature. The defrost distribution (FLOOR-DEF in FIG. 3) between the A point and the B point is carried out by the floor defrost bypass duct 17. A region used in a comfortable bi-level mode can be enlarged by preventing from the blur in the wind of the motor vehicle bypassing an warm wind to the defrost blow port. The above mentioned operations can be arranged as shown in the following table.

| door | actuating point | | |
|---|---|---|---|
| | A | A – B | b – C |
| vent | full open | stepless regulation | full close |
| floor | full close | stepless regulation | full open |
| defrost | full close | stepless regulation | stepless regulation till full open |

In a compensation control of solar radiation which increases the wind volume corresponding to the strength of the solar radiation and removes the affection of the solar radiation, the conventional control device in this field has such a drawback that the quantity of the upper blow air flow only has to be increased, but the lower blow air flow is also increased when the solar radiation is strong. However, as apparent from the explanation mentioned later, the present invention can increase the upper portion air flow without increasing the lower portion air flow by controlling the air flow distribution of the upper and lower blow ports corresponding to the quantity of the solar radiation. Namely, the present invention can increase the air flow volume of the vent blow port without increasing that of the floor blow port, changing the position of the side link without respect to the quantity of the solar radiation.

Hereunder, the desire air discharge temperature control and the wind volume distribution control of the present invention will be explained referring to formulae and flow charts.

The microcomputer as the control device 25 outputs each instruction signal for controlling the air mix doors 6, 7, the blow port changeover doors 8, 9, 10, and the external and internal air suction port door 5, etc. by inputting the converted digital signals of each detected signal of the outdoor air temperature sensor 26, the room air temperature sensor 27, the floor blow air temperature sensor 28, the vent blow air temperature sensor 29, the defrost blow air temperature sensor 30, and the solar radiation sensor 31, and the setting signals of the temperature setting device 32, the wind volume setting device 33, and the mode switch 34 through the A/D converter 25a, and carrying out the calculations and judgments explained later. The air mix doors 6, and 7 are latched by receiving the instruction signal of the opening degree control from the microcomputer 25, and regulating the opening degrees of the air mix doors 6, and 7 corresponding to the instruction signals from the microcomputer 25, through the opening degree control actuators for controlling the blow air temperature control. The actuator 22 is used for changing over the blow ports, latched by receiving the opening degree instruction signal from the microcomputer 25, and controls continuously the distribution of the air quantity of the upper and lower blow air volumes by operating the side link 21 which controls continuously each blow port changeover doors 8, 9, and 10. The blower motor driving circuit 35 is latched by receiving the rotational instruction signal from the microcomputer 25, and controls continuously the rotational speed of the blower motor 2 corresponding to the instruction signal from the microcomputer. The external and internal air suction port door control actuator 18 is latched by receiving the external and internal air changeover instruction signal from the microcomputer 25, and changeovers from the outdoor air to the room air, and vice versa in the passenger compartment of the vehicle.

Figure 4:
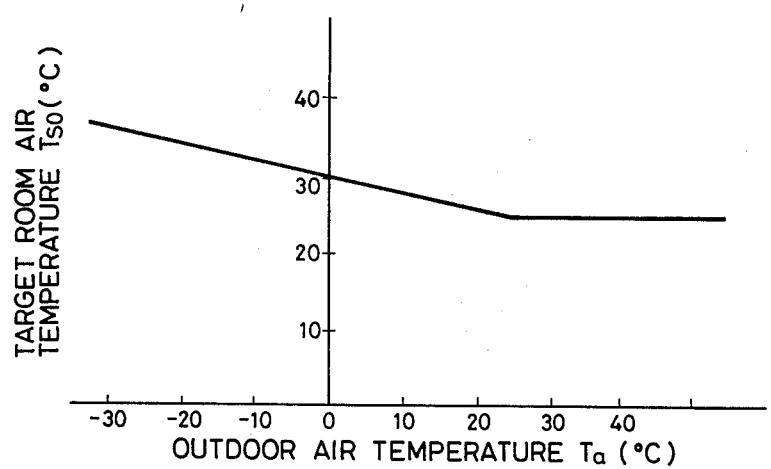
FIG. 4 shows target room air temperature characteristic diagram corresponding to outdoor air temperature.

Next, the operation of the temperature control of the present invention will be explained referring to FIGS. 2 and 4. In FIG. 2, the desired air discharge temperature changes the target control room air temperature corresponding to change of outdoor temperature, and when the room air is set to a selected setting temperature, a comfortable room temperature will be continuously obtained, even if the outdoor temperature changes.

Suppose that the upper portion desired air discharge temperature is $T_{dou}$, the lower portion desired air discharge temperature $T_{dol}$. $T_{dou}$, and $T_{dol}$ are shown as following formulae (1), and (2):

$$T_{dou} = T_{dbu} + K_P \Delta T_R \qquad (1)$$

$$T_{dol} = T_{dbl} + K_P \Delta T_R \qquad (2)$$

In the formulae (1) and (2), $K_P$ is a proportional constant. The desired air discharge temperatures are compensated by $\Delta T_R$ ($\Delta T_R = T_{SO} - T_R$), in which $T_{SO}$ is obtained by referring to FIG. 2, and $T_R$ is the compartment temperature to improve the compartment characteristics of the room air control. $T_{dbu}$, and $T_{dbl}$ are shown as the following formulae (3), and (4) FIG. 2, shows a characteristic diagram in the state that there is no solar radiation and the setting temperature is 25° C..

$$T_{dbu} = f_u(T_a) - K_{zu} \cdot Z_m + K_s(T_s - 25) \qquad (3)$$

$$T_{dbl} = f_l(T_a) - K_{zl} \cdot Z_m + K_s(T_s - 25) \qquad (4)$$

In the formulae (3), and (4), Ta is outdoor temperature, $T_s$ setting temperature. $f_u(Ta)$ can be represented by the function of the floor blow temperature such as shown in FIG. 2. $f_l(Ta)$ can be represented by the function of the vent blow temperature such as shown in FIG. 2. $K_{zu}$, and $K_{zl}$ show solar radiation compensation constants of the upper portion target blow air temperature and the lower portion target blow air temperature, respectively. $Z_m$ is a solar radiation measuring value by the solar radiation sensor 31. $K_{zu} \cdot Z_m$, and $K_{zl} \cdot Z_m$ are used for improving thermal feeling which gives to the passenger in the compartment by decreasing the blow air temperature, when the solar radiation increases. $K_s$ is a compensation constant when the setting temperature is changed. $K_s$ is used for compensating the response between the room temperature and the blow air temperature when the setting temperature is changed.

Figure 5:
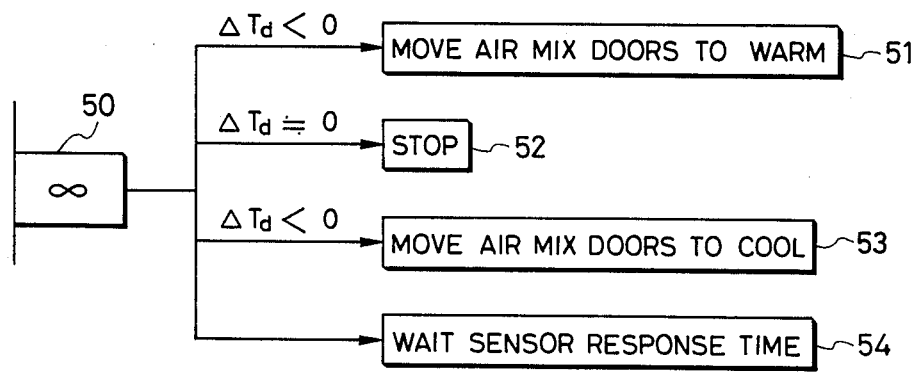
FIG. 5 shows diagram for explaining operations of an upper portion air mix door control actuator and a lower portion air mix door control actuator.

For obtaining the comfortable blow air temperature $T_{dou}$, and $T_{dol}$ according to the formulae explained above, the air mix doors 6, and 7 are operated as shown in the flow chart of FIG. 5 through the actuators 19, and 20. For example, the motor-driven actuators 19, and 20 are controlled in such a manner that $\Delta T_{dou}$, and $\Delta T_{dol}$ shown in the following formulae (5), and (6) is within $\pm 1°$ C..

$$\Delta T_{dou} = T_{dou} - T_{du} \qquad (5)$$

$$\Delta T_{dol} = T_{dol} - T_{dl} \qquad (6)$$

Wherein, $T_{du}$ is the blow air temperature measured by the vent blow air temperature sensor 29, and $T_{dl}$ is the blow air temperature measured by the floor blow air temperature sensor 28.

Referring to FIG. 5, when the actuators 19, and 20 are operating at step 50 and $\Delta T_{du} > 0$ at step 51, the air mix door 6 is moved to open for warming the compartment of the vehicle for $K_{du} \cdot \Delta T_{du}$ second (wherein $K_{du}$ is a proportional constant). When $\Delta T_{du}$ is between $-1°$ C. and $+1°$ C. inspecting the variation of the vent blow air temperature by the vent blow air temperature sensor, the actuator 19 is stopped at step 52. At the operation of the actuator 19, a time delay of the actuator 19 is set at step 54 considering the response time of the vent blow air temperature sensor. When $\Delta T_{du} < 0$ at step 53, the air mix door 6 is moved to close for cooling the compartment of the vehicle for $K_{du} \cdot \Delta T_{du}$ second. When $\Delta T_{du}$ is between $-1°$ C. and $+1°$ C., the actuator 19 is stopped. In the case of $\Delta T_{dol}$, control of the air mix door 7 is carried out in same manner in the case of $\Delta T_{dou}$. $K_{du}$, and $K_{dl}$ (proportional coefficient in $\Delta T_{dl}$) is able to change corresponding to the blow air temperature characteristics of the heater unit 4.

Hereunder, the stepless regulations of the upper and lower blow air flow volumes by the blow port changeover controls of the mode doors will be explained. The air flow volume distribution controls of the upper and lower blow ports 14, and 15 are carried out by operating the side link 21 linked to the actuator 22, and controlling the blow port changeover doors 8, 9, and 10 according to the following formula (7):

$$\alpha = T_a + K_{z\alpha} \cdot Z_m - K_{s\alpha}(T_s - 25) \qquad (7)$$

In the formula 7, $\alpha$ denotes the air wind volume distribution ratio of the upper and lower air blow ports 14, and 15. $K_{z\alpha}$ is a proportional constant when the sun shines, and is used for compensating the air wind volume distribution of the upper and lower air blows, increasing the air wind volume from the vent blow port 14 when the solar radiation is strong, and resolving the hot air feeling to the passenger in the compartment of the vehicle in the solar radiation state. $K_{s\alpha}$ is a compensation coefficient when the setting temperature by the temperature setting device 32 is changed, and decides the air wind volume distribution of the upper and lower blow ports.

Figure 6:
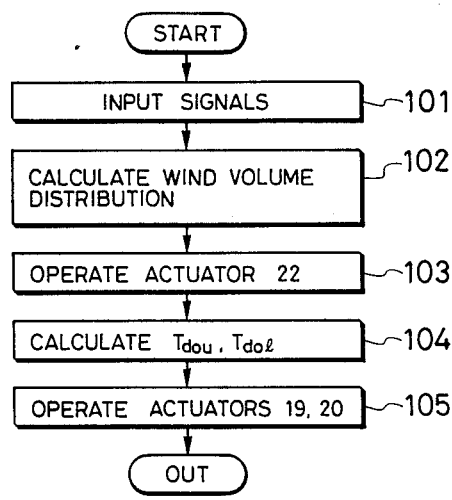
FIG. 6 shows a flow chart for explaining operations of the upper and lower portions air mix doors and the mode doors.

Referring to FIG. 6, the calculation processing of the air conditioning control program shown therein is carried out in a period of a number of hundreds mm seconds. In step 101, the room air temperature signal Tr from the room temperature sensor 27, the outdoor air temperature signal Ta, the upper portion blow air temperature signal $T_{du}$, the lower portion blow air temperature signal $T_{dl}$, the defroster blow air temperature signal $T_{dd}$, the opening degree signal $\alpha$ of the side link, the solar radiation volume signal $Z_m$, and the setting temperature signal $T_s$ are input and memorized to the control device 25. In step 102, the opening degree of the side link 21 is obtained from the formula (5) based on the data input and memorized at step 101. In step 103, the actuator 22 is operated for distributing the air wind volumes from the upper and lower blow air ports 14, and 15. In step 104, the comfortable desired air discharge temperatures $T_{dou}$, and $T_{dol}$ are obtained using the formulae (1), and (2) based on the data input and memorized at step 101. And in step 105, the actuator 22 is operated for controlling the opening degrees of the air mix doors based on the comfortable target blow air temperatures obtained at step 104 and the data input and memorized at step 101 in the manner explained in FIG. 5.

Figure 7:
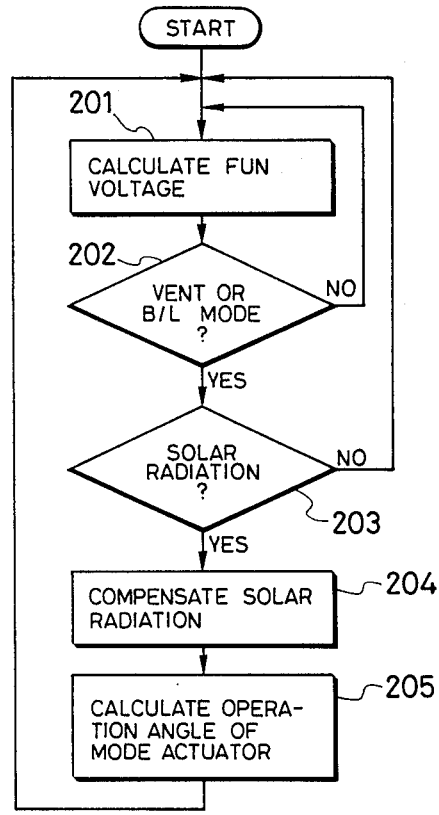
FIG. 7 shows a flow chart of air wind volume distribution control corresponding to solar radiation.
Figure 8:
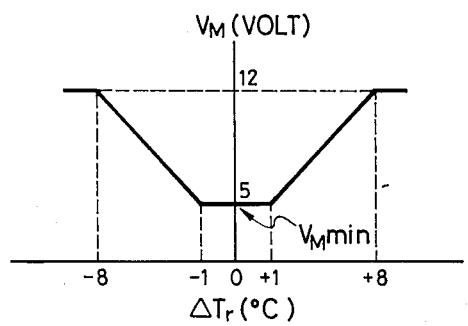
FIG. 8 shows blower voltage characteristic diagram corresponding to the difference between the target room air temperature and the room temperature.

Referring to FIG. 7, a calculation of the blower motor voltage is carried out according to FIG. 8 in step 201. In step 202, when the control of the air conditioning apparatus is in the vent mode or the bilevel mode, the flow proceeds to step 203. In step 203, it is judged whether there is a solar radiation. When there is the solar radiation the flow proceeds to step 204. In step 204, the compensation of the blower motor depending on the solar radiation is carried out by calculating the following formula (8):

$$V_M = V_{Mmin} + (A/60) \cdot Z_s \qquad (8)$$

wherein:

$V_{Mmin}$; minimum voltage of blower motor (in FIG. 8, 5 volts)
A ; proportional constant
$Z_s$ ; quantity of solar radiation Referring to FIG. 3, D corresponds to an operational angle of the mode actuator 22 when the blower motor voltage is 5 volts. When the compensated voltage of the blower motor is 6.5 volts at step 204, which corresponds to D' in FIG. 2, a compensation of the operational angle S shown in FIG. 2 is carried out at step 205 as the result of the solar radiation compensation by the mode actuator 22.

According to the present invention, the upper and lower temperature distributions and air flow distribution can be controlled as the passengers in the compartment desire. Since the air flow volume distribution is varied continuously when the blow ports are changed over; the changeovers of the blow ports are carried out without the passengers in the compartment feeling a sense of incompatibility, and a comfortable air conditioning apparatus for a motor vehicle can be supplied without equipping any additional flow damper and control actuator.

We claim:

1. An air conditioning apparatus for a motor vehicle which sets a controlled target upper portion air discharge temperature and a controlled target lower portion air discharge temperature, respectively depending on an outdoor air temperature, and obtains the upper controlled temperature air flow and the lower controlled temperature air flow corresponding to the controlled desired upper portion air discharge temperature and the controlled desired lower portion air discharge temperature, respectively, wherein a control device is equipped for controlling air flow volume distributions of an upper blow air port and a lower blow air port in such a manner that controls of a defrost blow temperature flowing through a defrost blow port, a vent blow temperature flowing through a vent blow port, and a floor blow temperature flowing through a floor blow port are carried out at same time based on a desired air discharge temperature control pattern corresponding to said outdoor temperature and a setting temperature by a temperature setting device, said control device controlling continuously and independently the degrees of the openings of the defrost blow port, the vent blow port and the floor blow port in an order of the vent blow port, and the defrost blow port or the floor blow port in accordance with a decrease of said outdoor temperature based on the target blow air temperature.

2. An air conditioning apparatus for a motor vehicle according to claim 1, wherein a unitary control means are equipped for controlling opening degrees collectively of a defrost door communicated to said vent blow port, and a floor door communicated to said floor blow port, by an instruction signal of said control device which outputs said instruction signal corresponding to said outdoor temperature for controlling wind volume distributions of the air flowing through said defrost door, said vent door, and said vent door.

3. An air conditioning apparatus for a motor vehicle according to claim 2, wherein said control device controls temperature of an air blown out of an upper portion temperature control air mix door and a lower portion temperature control air mix door corresponding to said outdoor air temperature.

4. An air conditioning apparatus for a motor vehicle according to claim 2, wherein a control mode is divided into a heater mode when the target air discharge temperature is larger that said controlled upper portion air discharge temperature, a vent mode when said target air discharge temperature is smaller than said controlled lower portion air discharge temperature, and a bi-level mode when said air discharge temperature is between said target temperatures;
when said control mode is in said heater mode, said defrost air discharge temperature and said floor air discharge temperature are controlled by said instruction signal of said control device;
when said control mode is in said bi-level mode, said vent air discharge temperature and said floor air discharge temperature are controlled by said instruction signal of said control device;
and when said control mode is in said vent mode, said vent air discharge temperature is controlled by said instruction signal of said control device.

5. An air conditioning apparatus for a motor vehicle according to claim 2, wherein a control mode is divided into a heater mode when the target air discharge temperature is larger than said desired upper portion air discharge temperature, a vent mode when said discharge air temperature is smaller that said desired lower portion air discharge temperature, and a bi-level mode when said target air discharge temperature is between said target temperatures;
when said control mode is in said heater mode, said defrosting door and said floor door are controlled independently by said unitary control means;
when said control mode in said bi-level mode, said defrost door, said vent door, and said floor door are controlled independently by said unitary control means;
when said control mode is in said vent mode, said vent door and said floor door are controlled independently by said unitary control means.

6. An air conditioning apparatus for a motor vehicle according to claim 2, wherein said unitary control means comprises a motor driven actuator and a link cam device for controlling said defrost door, said vent door, and said floor door.

7. An air conditioning apparatus for a motor vehicle according to claim 5, wherein said wind volume distribution is compensated corresponding to an amount of a solar radiation.

8. Air conditioning apparatus for a motor vehicle having means for setting a controlled target air discharge temperature for both an upper portion and a lower portion of a passenger compartment in said vehicle depending on an outdoor air temperature including;
a temperature setting device;
means responsive to the outdoor temperatures for obtaining an upper controlled temperature air discharge through an upper blow air port and a lower controlled temperature air discharge through a lower blow air port; and a control device responsive to a target air temperature control pattern corresponding to said controlled desired air discharge temperature and a setting temperature of said temperature setting device for controlling air flow volume distributions of the upper and lower blow air ports in a manner that simultaneously controls a defrost air discharge temperature of air flowing through a defrost port, a vent air discharge temperature of air flowing through a vent blow port and a floor air discharge temperature of air flowing through a floor blow port;

said control device being so constructed as to continuously and independently control the sizes of the openings of the defrost blow port, the vent blow port and the floor blow port in a sequence of first the vent blow port and then the defrost blow port or the floor blow port in accordance with a decrease of said outdoor temperature based on the target blow air temperature.

* * * * *